United States Patent Office.

EZRA MILLER, OF NEW YORK, N. Y.

Letters Patent No. 108,504, dated October 18, 1870.

IMPROVEMENT IN MEDICINES.

The Schedule referred to in these Letters Patent and making part of the same.

*To all whom it may concern:*

Be it known that I, EZRA MILLER, of the city and county of New York, in the State of New York, have discovered a new and useful Remedial Agent for Febrile and several other diseases; and I do hereby declare that the following is a full, clear, and exact description thereof.

My object is to utilize the roots, leaves, stems, and blossoms of a plant which is indigenous to the northwestern section of this country, and found in great abundance, covering large tracts of land lying along the railroad to California by way of Omaha. This plant, as far as I have been enabled to ascertain, has no botanical name, but is known by the general terms of "brush," "plain-brush," "alkali-brush," and "sage-brush," names which are used to distinguish it from the grasses of the plains.

The name I have determined to give this plant is "wahsatch," which is the name of the station and mountains of the region where I first made the discovery of its valuable medical properties.

The plant, after careful analysis, is found to contain a greenish, yellow-colored aromatic oil, having a peculiar odor, somewhat resembling fresh oil of origanum and camphor at the same time, and possessing a pungent taste.

An aqueous extract, which was obtained during the analysis, when filtered and evaporated to dryness at a water-bath heat, was of a brown color, and had a bitter taste, without pungency.

A portion of the fresh plant, digested with alcohol, yielded to the menstruum a yellow resin, a yellow, waxy matter, and a yellowish-green volatile oil.

Medical Uses.

Wahsatch is an excellent stimulant tonic, and may be used as a tonic for dyspepsia, and in primary or advanced stages of diarrhea and dysentery. It is a febrifuge, an anthelmintic, and a vermifuge.

The tonic and febrifuge will be formed in the aqueous decoction or extract; the vermifuge in the oil and resin; and the emmenagogue and diaphoretic in the form of a hot tea, freshly prepared, and before the oil is expelled by too long boiling.

An excellent, mild tonic and stomachic may be made of the wahsatch, pulverized, one pound; gentian, two ounces and a half; sassafras, two ounces; sweet-orange peel, two ounces; a little loaf-sugar, and good French spirits, sixteen gallons.

The wahsatch may be furnished under any of the well-known officinal forms, according to the various applications for which it may be required.

I prepare medicines so as to utilize the virtues of the plant in the following manner:

First, by making extracts and tinctures in the ordinary manner.

Second, by drying and pulverizing.

Third, by forming pastes, or concentrated extracts.

Fourth, by combining either of the above with other materials, medicinal or neutral, so as to form compounds in the manner usually practiced by pharmaceutists.

Having described my discovery,

I claim—

The new medicines herein described, made from "wahsatch," or "brush-plant," as set forth.

EZRA MILLER.

Witnesses:
HUGO V. BRANDENSTEIN,
J. FR. DUINKERKE.